United States Patent
Ma et al.

(10) Patent No.: US 9,954,984 B2
(45) Date of Patent: Apr. 24, 2018

(54) SYSTEM AND METHOD FOR ENABLING REPLAY USING A PACKETIZED LINK PROTOCOL

(71) Applicant: Nvidia Corporation, Santa Clara, CA (US)

(72) Inventors: Dennis Ma, Santa Clara, CA (US); Michael Osborn, Santa Clara, CA (US); Eric Tyson, Santa Clara, CA (US); Stephen D. Glaser, Santa Clara, CA (US); Marvin Denman, Santa Clara, CA (US); Jonathan Owen, Santa Clara, CA (US); Mark Hummel, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 27 days.

(21) Appl. No.: 14/883,322

(22) Filed: Oct. 14, 2015

(65) Prior Publication Data

US 2017/0111144 A1  Apr. 20, 2017

(51) Int. Cl.
*H04L 29/08* (2006.01)
*H04L 1/18* (2006.01)

(52) U.S. Cl.
CPC .......... *H04L 69/324* (2013.01); *H04L 1/1809* (2013.01); *H04L 69/323* (2013.01)

(58) Field of Classification Search
None
See application file for complete search history.

(56) References Cited

U.S. PATENT DOCUMENTS

| 2004/0042491 A1* | 3/2004 | Sarkkinen | H04L 1/1642 370/469 |
|---|---|---|---|
| 2007/0047591 A1* | 3/2007 | Senthilnathan | H04L 1/0041 370/503 |
| 2008/0049757 A1* | 2/2008 | Bugenhagen | H04L 12/2602 370/395.1 |
| 2010/0088569 A1* | 4/2010 | Sorbara | H03M 13/6306 714/751 |

* cited by examiner

*Primary Examiner* — Mujtaba M Chaudry

(57) ABSTRACT

A receiver, transmitter and method for enabling a replay using a packetized link protocol are provided. In one embodiment, the method includes: (1) transmitting a stream of packets including an untagged packet and (2) using synchronized counters to determine a sequence ID of the untagged packet, which is a corrupt/lost packet that needs to be retransmitted.

20 Claims, 2 Drawing Sheets

SYSTEM AND METHOD FOR ENABLING REPLAY USING A PACKETIZED LINK PROTOCOL

TECHNICAL FIELD

This application is directed, in general, to a communication protocol between devices and, more specifically, to a system and method of enabling a replay using a packetized link protocol.

BACKGROUND

A communication, or link, protocol is a system of rules that allows two or more devices to communicate data with each other. A link protocol defines the syntax, semantics and synchronization of the communication that takes place and establishes error recovery mechanisms for re-establishing communication should errors occur. If the data is contained in packets, the protocol is termed a packetized protocol.

One of the error recovery mechanisms commonly provided in a link protocol is a replay mechanism. The replay mechanism allows a receiving device to request a transmitting device (a "transmitter") to retransmit data that is lost or corrupted during communication. Conventional error recovery mechanisms for packetized link protocols employ an identifying tag, or ID tag, in each packet of data transmitted between devices such that the receiving device (a "receiver") can determine, and request the resending of only, the packets that are lost or corrupted. The transmitter therefore only has to resend those packets. The ID tags are usually communicated "in-band," that is, they are embedded in the packets themselves, and not in a separate stream. These error recovery mechanisms have proven reliable and are in wide use today, particularly in the context of streaming video.

SUMMARY

One aspect provides a method for enabling a replay using a packetized link protocol. In one embodiment, the method includes: (1) transmitting a stream of packets including an untagged packet and (2) using synchronized counters to determine a sequence ID of the untagged packet, which is a corrupt/lost packet that needs to be retransmitted.

Another aspect provides a transmitter for enabling a replay using a packetized link protocol. In one embodiment, the transmitter includes: (1) a physical layer interface configured to transmit a stream of packets including an untagged packet and (2) a transmitter sequence ID counter synchronized with a receiver sequence ID counter and configured to count a number of received packets in the stream. The transmitter sequence ID counter and the receiver sequence ID counter are used to determine a sequence ID of the untagged packet.

In yet another aspect provides a receiver for enabling a replay using a packetized link protocol. In one embodiment, the receiver includes: (1) a physical layer interface configured to receive a stream of packets including an untagged packet and (2) a receiver sequence ID counter synchronized with a transmitter sequence ID counter and configured to count a number of received packets in the stream. The receiver sequence ID counter and the transmitter sequence ID counter are used to determine a sequence ID of the untagged packet.

BRIEF DESCRIPTION

Reference is now made to the following descriptions taken in conjunction with the accompanying drawings, in which.

DETAILED DESCRIPTION

As stated above, conventional error recovery mechanisms for packetized link protocols employ an ID tag in each packet of data transmitted from a transmitter to one or more receivers such that the receiver(s) can determine, and request the resending of only, the packets that are lost or corrupted.

As effective as this mechanism has been to date, it is realized herein that adding ID tags to packets increases their length. Stated another way, adding ID tags to packets decreases the bandwidth they have available to carry data. As implied above, ID tags could be communicated "out of band" through the use of a separate (control) stream, but the overall bandwidth transmitters and receivers have available for data communication is still reduced, because they would have to handle the additional stream.

It is realized herein that some bandwidth may be recovered were it not necessary to include an ID tag with every packet. More specifically, it is realized herein that a mechanism for enabling a replay that does not require the tagging of every packet would be advantageous.

Introduced herein are various embodiments of a system and method for enabling a replay in a packetized link protocol that operate with a data stream in which not every packet in the stream has an ID tag. Instead, the transmitter and the receiver identify the packets transmitted and received using counters. The counters are synchronized as needed or desired. In certain embodiments, relatively few of the packets in a given stream are explicitly identified; most packets are identified only by means of the counters.

In one embodiment, synchronization is needed only (1) for the initial packet of a data stream and (2) for packets that are part of a replay following an error. In another embodiment, synchronization is also carried out when the data channel bearing the packets is idle (when the bandwidth of the channel is not an issue). In various embodiments introduced herein, the counters at the transmitter and the receiver allow the packets that do not contain ID tags to be implicitly "tagged" by the system and method without adding to the length of those packets.

In one embodiment, when the transmitter detects that an error has occurred, the transmitter sends a series of special packets that include ID tags for the packets to be resent. When a receiver receives these special packets, it recognizes that these special packets (1) indicate a replay will follow and (2) identify the packets that will constitute the replay.

Figure 1:
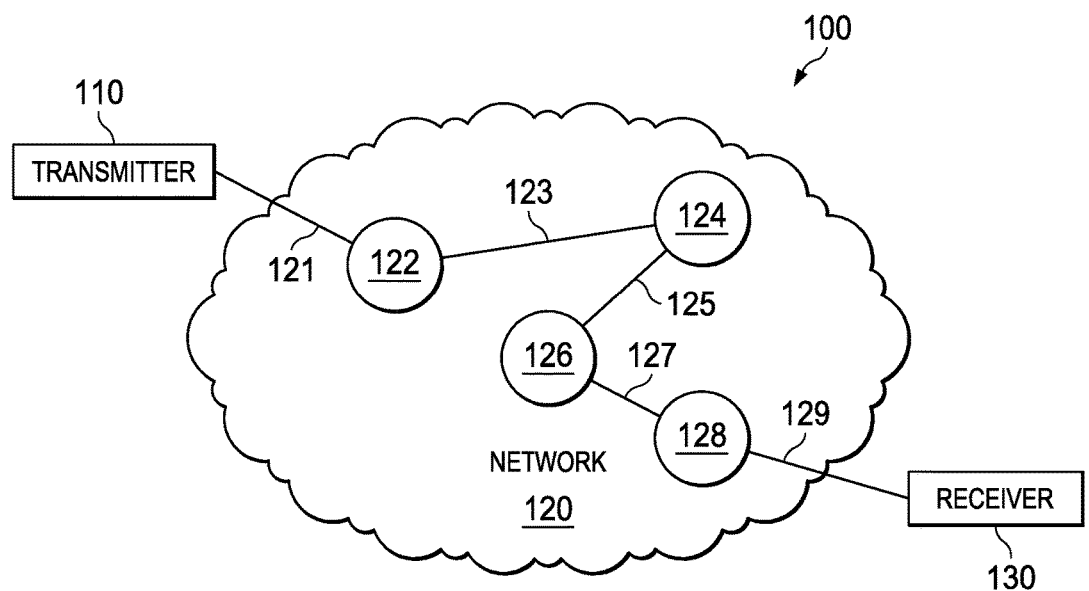
FIG. 1 is a block diagram of a portion of a network in which a data channel bearing a packetized data stream exists.

FIG. 1 is a block diagram of a network 120 and a system 100 that communicates through the network 120. The network 120 may be a wired network, a wireless network or a hybrid network having both wired and wireless networks. In one embodiment, the network 120 may an intranet, and the transmitter 110 and receiver 130 may be two interconnected devices using a communication/link protocol such as NVLink®, a service of NVIDIA Corporation of Santa Clara, Calif. In such an embodiment, the interconnected devices may be located on different die within a multi-chip module or on different packages on a printed circuit board.

The system 100 includes the transmitter 110 and a receiver 130. The transmitter 110 transmits a stream of packets, e.g., audio and video packet of a streaming multimedia application, to the receiver 130 via a data channel. The transmitter 110 may be an end-user device such as a desktop or laptop personal computer, a tablet, a smartphone, or a smart television or a processing unit such as a CPU or GPU in such end-user devices. In one embodiment, the transmitted packets may be divided into multiple "flits," each of which is 128-bits of data that serves as a unit of transfer in the current implementation of NVLink®. In such an embodiment, flits of packets are implicitly numbered using sequence IDs, and each packet is referred by the implicit sequence ID of its last flit.

The receiver 130 receives the stream of packets transmitted from the transmitter 110. The receiver 130 may be an end-user device such as a desktop or laptop personal computer, a tablet, a smartphone, or a smart television or a processing unit such as a CPU or GPU in such end-user devices.

In the illustrated embodiment, the data channel in the network 120 includes multiple physical links 121, 123, 125, 127. 129 connected by multiple routers 122, 124, 126, 128. The physical links 121, 123, 125, 127, 129 may be of various media or types, including Ethernet, Wi-Fi, and cellular connections, such as Long Term Evolution (LTE). Packets passing through these links may use various communication protocols, including internet protocol such as Transmission Control Protocol (TCP) and User Datagram Protocol (UDP) or a proprietary communication/link protocol such as NVIDIA® NVLink®.

Figure 2A:
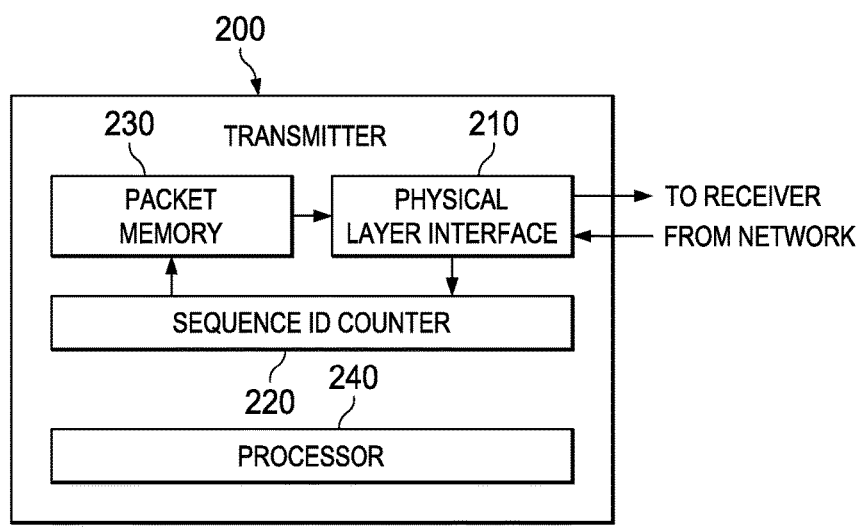
FIGS. 2A and 2B are block diagrams of respective embodiments of a transmitter and receiver for enabling a replay using a packetized link protocol.
Figure 2B:
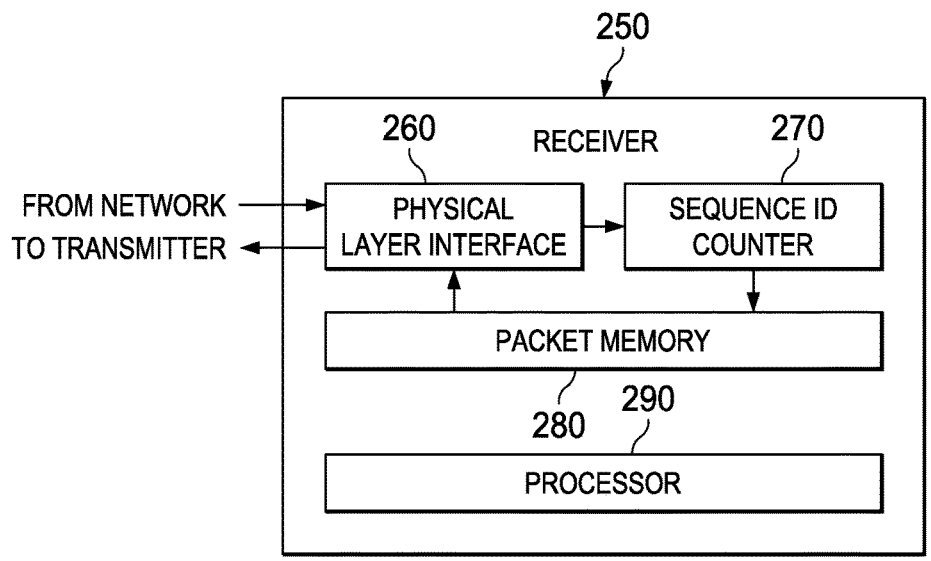

FIGS. 2A and 2B are block diagrams of embodiments of a transmitter 200 such as the transmitter 110 of FIG. 1 and receiver 250 such as the receiver 130 of FIG. 1 coupled to one another, for enabling a replay using a packetized communication/link protocol. In one embodiment, the transmitter 200 and the receiver 250 may be interconnected devices in an intranet.

In FIG. 2A, the transmitter 200 includes a physical layer interface 210, a transmitter sequence identifier (ID) counter 220, and a packet memory 230. The transmitter 200 is configured to transmit a stream of packets, e.g., video and audio packets of streaming gaming or multimedia application, to the receiver 250 via a data channel.

In the illustrated embodiment, the physical layer interface 210 is configured to transmit a stream of packets that includes an untagged packet. A packet is "tagged" when the packet includes an embedded ID tag that identifies the packet by a sequence ID, and a packet is "untagged" when the packet does not include the embedded ID tag. In the illustrated embodiment, the untagged packet is determined as a corrupted/lost packet that needs to be retransmitted.

The physical layer interface 210 is also configured to send an initiation packet that notifies the receiver 250 that a packet transmission will follow. As such, an initiation packet is sent before transmitting a stream of packets including replay packets. A "replay packet" refers to a corrupt/lost packet that needs to be retransmitted in a replay, such as the aforementioned untagged packet. In one embodiment, the initiation packet may include the sequence ID of a first packet in the following stream of packets. In such an embodiment, none of the packets in the following stream is tagged. In another embodiment, only the first packet of the following stream of packets is tagged. It is understood that an initiation packet is non-replayable packet that is not numbered and acknowledged using sequence IDs.

In the illustrated embodiment, the transmitter sequence ID counter 220 is configured to count the number of received packets in a given stream. In one embodiment, the transmitter sequence ID counter 220 counts the number of packets that are confirmed to be received at the receiver 250. A packet is confirmed to be received when the transmitter receives from the receiver an acknowledgment that the received packet is error-free or recoverable.

Using an initiation packet, the transmitter sequence ID counter 220 is synchronized with the receiver sequence ID counter 270 before a packet stream transmission, e.g., before transmitting a stream of packets including replay packets. In one embodiment, the transmitter sequence ID counter 220 may be additionally synchronized with the receiver sequence ID counter 270 when the data channel bearing a stream of packets is idle. The transmitter sequence ID counter 220 may be located in the processor 240.

In the illustrated embodiment, the packet memory 230 is configured to store recently transmitted packets that have not yet been confirmed to be received. In one embodiment, the packet memory 220 is in the form of a replay buffer, and the recently transmitted packets are stored therein. The packet memory 220 may be located in a network interface controller (NIC) or the processor 240.

The processor 240 is coupled to the transmitter sequence ID counter 220 and is configured to determine the sequence ID of the untagged packet in the stream using synchronized counters, i.e. the transmitter sequence ID counter 220 and the receiver sequence ID counter 280. In one embodiment, the sequence ID of the untagged packet is determined based on the synchronized count of the transmitter and receiver sequence ID counters 220, 270 and the sequence ID of the first packet in the stream, which is indicated by the initiation packet preceding the stream. In another embodiment, the sequence ID of the untagged packet is determined based on the synchronized count of the transmitter and receiver sequence ID counters 220, 270 and the sequence ID of the tagged first packet in the stream. In certain embodiments where the received packets are divided into multiple flits, flits of packets are implicitly numbered using sequence IDs and each packet is counted using the implicit sequence ID of its last flit.

In FIG. 2B, the receiver 250 includes a physical layer interface 260, a packet memory 270, and the receiver sequence ID counter 280. The receiver 250 is configured to receive a stream of packets, e.g., video and audio packets of streaming gaming or multimedia application, transmitted from the transmitter 200 via a data channel.

In the illustrated embodiment, the physical layer interface 260 is configured to receive a stream of packets including an untagged packet. In the illustrated embodiment, the untagged packet is determined as a corrupted/lost packet that needs to be retransmitted.

The physical layer interface 260 is also configured to receive an initiation packet that notifies the receiver 250 that a packet stream transmission will follow. As such, an initiation packet is sent before transmitting a stream of packets including replay packets. In one embodiment, the initiation packet may include the sequence ID of a first packet in the following stream of packets. In another embodiment, the first packet in the stream of packets may be tagged.

In the illustrated embodiment, the receiver sequence ID counter 270 is configured to count the number of received packets in a given stream. Using the initiation packet, the receiver sequence ID counter 270 is synchronized with transmitter ID counter 220 before a packet transmission. In one embodiment, the receiver sequence ID counter 270 may be additionally synchronized with the transmitter sequence ID counter 220 when the data channel bearing a stream of packets is idle. The receiver sequence ID counter 270 may be located in the processor 290.

In the illustrated embodiment, the packet memory 280 is configured to store recently received packets that have not yet been processed. In one embodiment, the packet memory 280 is in the form of a buffer and may be located in a network interface controller (NIC) or the processor 290.

The processor 290 is coupled to the receiver sequence ID counter 270 and is configured to determine the sequence ID of the untagged packet in the stream using synchronized counters, the transmitter sequence ID counter 220 and the receiver sequence ID counter 280 of the receiver 250. In one embodiment, the implicit sequence ID of the untagged packet is determined based on the synchronized count of the transmitter and receiver sequence ID counters 220, 270 and the sequence ID of the first packet in the stream, which is indicated by the initiation packet preceding the stream. In another embodiment, the sequence ID of the untagged packet is determined based on the synchronized count of the transmitter and receiver sequence ID counters 220, 270 and the sequence ID of the tagged first packet in the stream. In certain embodiments where the received packets are divided into multiple flits, flits of packets are implicitly numbered using sequence IDs and each packet is counted using the implicit sequence ID of its last flit.

Figure 3:
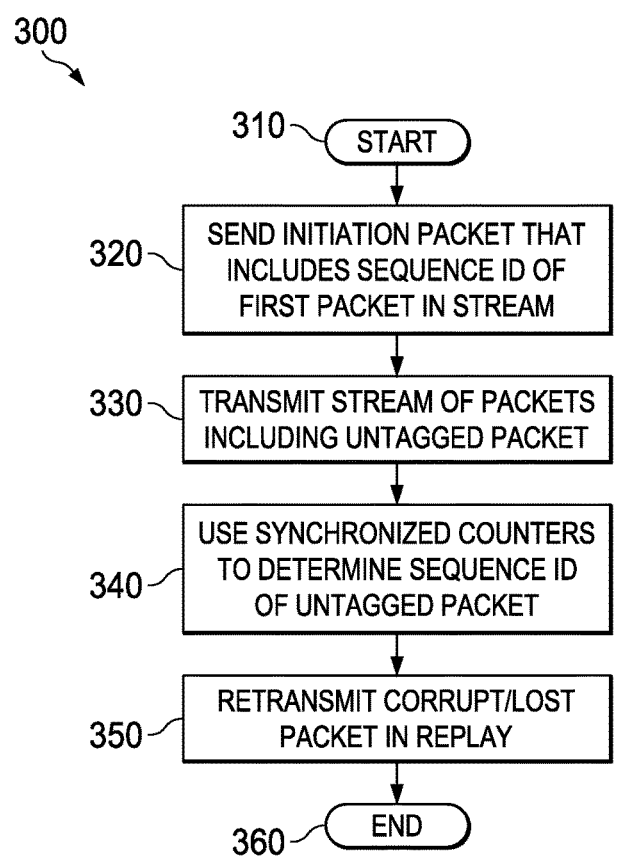
FIG. 3 is a flow diagram of one embodiment of a method of enabling a replay using a packetized link protocol.

FIG. 3 is a flow diagram of one embodiment of a method 300 of enabling a replay using a packetized link protocol. In one embodiment, the illustrated method 300 is implemented in a network where a stream of packets is transmitted over a data channel having multiple physical links of multiple types over multiple platforms. In another embodiment, the illustrated method 300 is implemented in an intranet where devices, e.g., between a CPU and GPU or among GPUs, are interconnected using a communication protocol such as NVIDIA® NVLink®. In such an embodiment, the interconnected devices may be on different dies within a multi-chip module or on different packages on a printed circuit board.

The method begins in a start step 310. In a step 320, a transmitter sends an initiation packet notifying a receiver that a stream of packets will follow. In one embodiment, an initiation packet may include the sequence ID of the first packet in the following stream of packets.

In a step 330, the transmitter sends a stream of packets including an untagged packet to the receiver. Each of the packets in the stream includes a header and payload. The header may include an error detecting measure such as a Cyclic Redundancy Check ("CRC") that is calculated against the payload and optionally, the implicit sequence ID of the packet.

In one embodiment where the initiation packet includes the sequence ID of the first packet in the following stream, all other packets in the stream may be untagged. In an embodiment where the initiation packet does not include the sequence ID of the first packet in the following stream, only the first packet in the following stream may be tagged.

In a step 340, using the synchronized sequence ID counters, the implicit sequence IDs of the packets including the untagged packet are determined. In one embodiment, the sequence ID of the untagged packet is determined based on the sequence ID of the first packet of the stream indicated in the preceding initiation packet and the synchronized count of the sequence ID counters.

In one embodiment, the receiver determines whether the untagged packet is corrupt by verifying the payload of the untagged packet using the CRC that was calculated against the payload of the untagged packet at the transmitter. In another embodiment, the receiver determines whether the untagged packet is lost by verifying the implicit sequence ID of the received packet using the CRC calculated against the implicit sequence ID at the transmitter. If the implicit sequence ID of the received packet cannot be verified using the CRC, the received packet is not the untagged packet and the untagged packet is considered lost. In this particular embodiment, the implicit sequence ID used in the CRC calculation and verification is not transmitted with the respective packet but added to the packet at the transmitter and receiver.

In a step 350, the transmitter retransmits in a replay the untagged, corrupt/lost packet to the receiver. In one embodiment, a replay initiation packet notifying the receiver that the replay will follow is sent before the replay. The replay initiation packet may be sent when the transmitter does not receive an acknowledgement confirming a receipt of a transmitted packet within in a certain time period.

The replay initiation packet may synchronize the transmitter and receiver sequence ID counters using the sequence ID of a first packet in the subsequent replay. In one embodiment where the replay initiation packet does not include the sequence ID of the first packet in the subsequent replay, the first packet of the replay may be tagged. The method ends in an end step 360.

In one embodiment, the receiver may determine, using the sequence ID (of the first packet in the subsequent replay) in the initiation packet, that the lost/corrupt packet did not cause any actual data loss, e.g., when the corrupt packet is disregarded/stomped or a non-replayable packet. In such an embodiment, the stream of packets may continue without a replay. This prevents negative performance implications resulting from the receiver falling into a standby ("CRC failed, waiting for replay") state.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described apparatuses and methods or at least a portion thereof may be embodied in or performed by various, such as conventional, digital data processors or computers, wherein the computers are programmed or store executable programs of sequences of software instructions to perform one or more of the steps of the methods, e.g., steps of the method of FIG. 3. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 3, or functions of the apparatuses described herein, e.g., a receiver and a transmitter.

Certain embodiments of the invention further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method for enabling a replay using a packetized link protocol, comprising:
   transmitting a stream of packets including an untagged packet;
   using counters to determine a sequence ID of said untagged packet; and
   synchronizing said counters using a non-replayable initiation packet before said replay, said non-replayable initiation packet not being acknowledged using a sequence ID.

2. The method as recited in claim 1, wherein said counters include a first sequence ID counter at a transmitter with a second sequence ID counter at a receiver.

3. The method as recited in claim 1, further comprising synchronizing said counters when a data channel bearing said stream is idle.

4. The method as recited in claim 1, further comprising sending a first initiation packet that includes a sequence ID of a first packet of said stream.

5. The method as recited in claim 1, further comprising determining whether said untagged packet is lost by using a Cyclic Redundancy Check calculated against the sequence ID of said untagged packet.

6. The method as recited in claim 1, further comprising sending said non-replayable initiation packet that includes a sequence ID of a first packet in said replay.

7. The method as recited in claim 1, wherein a first packet of said stream is tagged.

8. A transmitter for enabling a replay using a packetized link protocol, comprising:
   a physical layer interface configured to transmit a stream of packets including an untagged packet; and
   a transmitter sequence ID counter synchronized with a receiver sequence ID counter and configured to count a number of received packets in said stream, wherein said transmitter sequence ID counter and said receiver sequence ID counter are used to determine a sequence ID of said untagged packet, and said transmitter sequence ID counter is synchronized with said receiver sequence ID counter using a non-replayable initiation packet before said replay, said non-replayable initiation packet not being acknowledged using a sequence ID.

9. The transmitter as recited in claim 8, wherein said transmitter sequence ID counter is synchronized with said receiver sequence ID counter when a data channel bearing said stream is idle.

10. The transmitter as recited in claim 8, wherein said physical layer interface is further configured to send a first initiation packet that includes a sequence ID of a first packet of said stream.

11. The transmitter as recited in claim 8, wherein said untagged packet is a corrupt/lost packet.

12. The transmitter as recited in claim 8, wherein said physical layer interface is further configured to send said non-replayable initiation packet that includes a sequence ID of a first packet of said replay.

13. The transmitter as recited in claim 8, wherein a first packet of said stream is tagged.

14. The transmitter as recited in claim 8, wherein a first packet of said replay is tagged.

15. A receiver for enabling a replay using a packetized link protocol, comprising:
   a physical layer interface configured to receive a stream of packets including an untagged packet; and
   a receiver sequence ID counter synchronized with a transmitter sequence ID counter and configured to count a number of received packets in said stream, wherein said receiver sequence ID counter and said transmitter sequence ID counter are used to determine a sequence ID of said untagged packet, and said receiver ID counter is synchronized with said transmitter sequence ID counter using a non-replayable initiation packet before said replay, said non-replayable initiation packet not being acknowledged using a sequence ID.

16. The receiver as recited in claim 15, wherein said receiver sequence ID counter is synchronized with said transmitter sequence ID counter when a data channel bearing said stream is idle.

17. The receiver as recited in claim 15, wherein said physical layer interface is further configured to receive a first initiation packet that includes a sequence ID of a first packet of said stream.

18. The receiver as recited in claim 15, wherein said physical layer interface is further configured to receive said non-replayable initiation packet that includes a sequence ID of a first packet of said replay.

19. The receiver as recited in claim 15, wherein a first packet of said stream is tagged.

20. The receiver as recited in claim 15, wherein a first packet of said replay is tagged.

* * * * *